No. 791,096. PATENTED MAY 30, 1905.
W. HOOPES.
WIRE.
APPLICATION FILED JAN. 26, 1904.
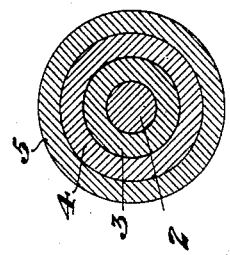
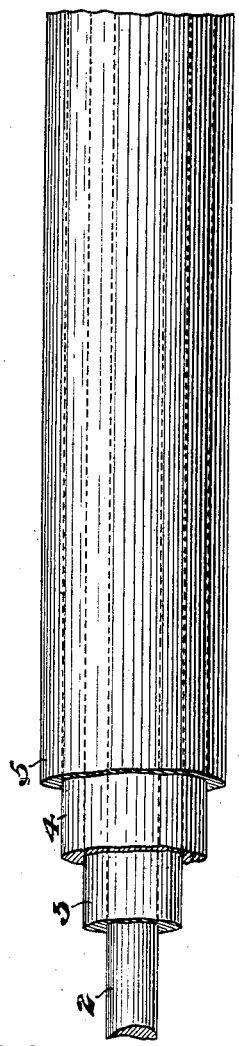
WITNESSES
INVENTOR No. 791,096. Patented May 30, 1905.

UNITED STATES PATENT OFFICE.

WILLIAM HOOPES, OF PITTSBURG, PENNSYLVANIA, ASSIGNOR TO THE PITTSBURGH REDUCTION COMPANY, OF NEW KENSINGTON, PENNSYLVANIA, A CORPORATION OF PENNSYLVANIA.

WIRE.

SPECIFICATION forming part of Letters Patent No. 791,096, dated May 30, 1905.

Application filed January 26, 1904. Serial No. 190,710.

*To all whom it may concern:*

Be it known that I, WILLIAM HOOPES, of Pittsburg, Allegheny county, Pennsylvania, have invented a new and useful Improvement in Wire, of which the following is a full, clear, and exact description, reference being had to the accompanying drawings, forming part of this specification, in which—

Figure 1 shows in plan view, partly in section, a rod or ingot from which my improved wire is made in accordance with my invention. Fig. 2 is a vertical cross-section on the line II II of Fig. 1.

The purpose of my invention is to provide a wire which shall afford the strength and resistance to cross fracture which is afforded by a stranded cable, but which shall be free from the objections to which cables are subject.

In the drawings, 2 represents the central core of a compound rod or ingot constructed in accordance with my invention, and 3 4 5 are concentric tubular layers of the same material. The rod or ingot so constituted by placing the several tubes and core together when cold or by casting them concentrically without welding throughout their length is then rolled and drawn to the form of wire of the desired size. By thus making a compound wire consisting of a series of concentric layers unwelded together liability of breakage due to crystallization is removed because the laminated wire will not vibrate with the readiness with which a solid wire vibrates, and if crystallization happens to start at any point of the cross-section of the wire it can only spread to the limits of the lamination in which it begins. By laminating the wire in this way I secure greater flexibility and greater tensile strength than could be obtained in solid wire of the same material and area of cross-section, and I secure greater reliability by confining the effect of any imperfections to a small portion of the section of the wire.

It is important that the method of manufacture of the wire should be such that the several laminæ will not weld together, since the welding of the laminæ in an electric conductor would defeat to a great extent the advantages which my invention affords.

I am aware that tubes have been drawn one upon the other and that bimetallic wires have been made by placing a steel core in a copper-wire ingot and rolling and drawing both together; but I believe it to be new to make a laminated wire in which adjacent laminæ are of the same material and are unwelded to each other.

I do not desire to limit myself to the mode of manufacture of the original ingot or bar from which the wire is rolled and drawn, all that is essential being that it shall be composed of concentric laminæ of the same material not welded together.

I claim—

1. As a new article of manufacture, a wire composed of separate concentric laminæ of the same material in contact with each other; substantially as described.

2. As a new article of manufacture, a wire composed of a core covered by separate, closely-fitting laminæ of the same material; substantially as described.

In testimony whereof I have hereunto set my hand.

WILLIAM HOOPES.

Witnesses:
 THOMAS W. BAKEWELL,
 GEO. B. BLEMING.